B. S. ROBERTS.
Breech Loader.
No. 2,067.
Reissued Sept. 5, 1865.
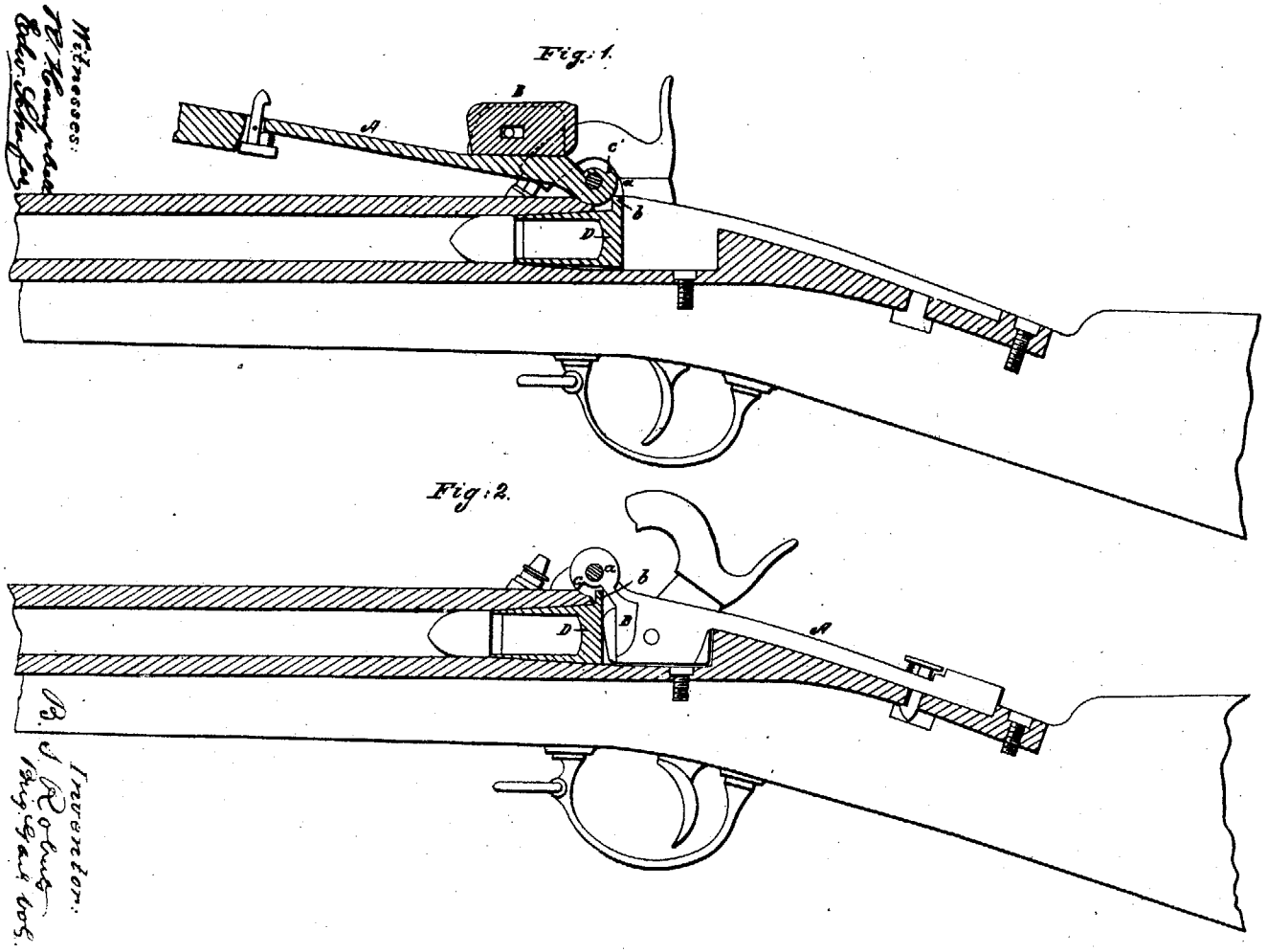

UNITED STATES PATENT OFFICE.

BENJAMIN S. ROBERTS, OF THE UNITED STATES ARMY.

IMPROVEMENT IN BREECH-LOADING FIRE-ARMS.

Specification forming part of Letters Patent No. 36,531. dated September 23, 1862; Reissue No. 2,067, dated September 5, 1865.

DIVISION 1.

*To all whom it may concern:*

Be it known that I, BENJAMIN S. ROBERTS, of the United States Army, have invented a new and useful Improvement in Breech-Loading Fire-Arms; and I do hereby declare that the following is a full, clear, and exact description of the same, reference being had to the accompanying drawings, forming part of this specification, in which—

Figure 1 is a vertical longitudinal section of a fire-arm as it appears when the metallic cartridge is ready to be driven home by the breech-piece. Fig. 2 is a vertical longitudinal section of the same after the cartridge is driven home.

Similar letters of reference in the two figures indicate corresponding parts.

The nature of my invention consists in constructing and arranging the breech-piece to open with an upward movement, and with a spur or tooth or hook on its hinge portion when the same is applied to the "arm" at a point above the bore, as hereinafter described, and above the cartridge, in such a manner that the upward movement of the breech-piece causes the spur to take hold of the cartridge just about when the spur is immediately under the hinge-pin in such a manner as to avoid any perceptible deflection of the cartridge from a straight line during the operation of starting it from its seat, this relative arrangement of parts also obviating the necessity of cutting down entirely through the stock in altering muzzle-loading muskets in breech-loaders.

To enable others skilled in the art to make and use my invention, I will proceed to describe the same with reference to the drawings.

A B designate the breech-piece of the gun. It is hinged to the breech end of the barrel above the line of the bore, as indicated by the letter *a*, so as to swing upward and forward or backward and downward. The construction of the breech-piece and the construction of the arm may be substantially as represented, or of any other approved or practical construction, so also as to the cartridges; but in all cases the breech-piece must be arranged to open upward, and must fit into a chamber cut down from the top of the stock, so as to form a continuation of the bore of the barrel in such manner that when the cartridge has been started and the stock depressed, the cartridge-case will readily fall out or may be readily withdrawn by hand.

C is the spur or hook formed on the breech-piece by cutting out a portion of the metal forming or inclosing the eye of the hinge, as represented, or by constructing the hinged portion with a projecting hook or tooth on its circumference.

D is a metallic cartridge-case, of conic or cylindric form, and constructed with a flange or projection, *b*, with which the corresponding jog or spur or catch, C, of the hinge engages as the lever A of the barrel-piece B is thrown upward to the position shown in Fig. 1.

It will be observed from the drawings that the flange of the metallic cartridge, when the cartridge is fully driven home, always occupies a position which will insure an engagement between it and the spur or catch of the hinged breech-piece, and therefore, when the breech-piece is moved from the position shown in Fig. 2 to the position shown in Fig. 1 the metallic cartridge will be partially drawn out of its seat in the breech end of the barrel. The cartridge-case when thus partially drawn out can be very readily and conveniently removed by hand, or by reason of its conic form will drop out and another may be inserted in its place. It is also very important, in the use of breech-loading fire-arms and metallic cartridges, to provide some means for starting the cartridges from their seats in the breech of the barrel, for without such provision great inconvenience and much loss of time are experienced in getting the empty cases out of the way. The means I have provided are very simple and compact as well as effective, and by the application of the same to the arm no inconvenience from leaks at the joint are experienced, the arrangement shown being such that a very perfect joint at the breech is secured when the arm is in condition for being fired. By my construction and arrangement I am enable to further improve the old musket used in the service which has been altered to a breech-loader, by a very slight additional cost.

What I claim as my invention, and desire to secure by Letters Patent, is—

The relative position of the breech-piece, hinge, and spur to the line of bore by which a muzzle-loading musket may be converted into a breech-loader which is capable of partially retracting a metallic cartridge without the necessity of cutting entirely through the stock or barrel of the arm, substantially as described.

B. S. ROBERTS.

Witnesses:
T. CAMPBELL,
A. MOORE.